United States Patent
Lv et al.

(10) Patent No.: US 12,493,715 B2
(45) Date of Patent: Dec. 9, 2025

(54) METHODS, APPARATUSES, AND SYSTEMS FOR COLLABORATIVELY UPDATING MODEL BY MULTIPLE PARTIES FOR IMPLEMENTING PRIVACY PROTECTION

(71) Applicant: Alipay (Hangzhou) Information Technology Co., Ltd., Hangzhou (CN)

(72) Inventors: Lingjuan Lv, Hangzhou (CN); Weiqiang Wang, Hangzhou (CN); Yuan Qi, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 145 days.

(21) Appl. No.: 18/283,343

(22) PCT Filed: Mar. 18, 2022

(86) PCT No.: PCT/CN2022/081672
§ 371 (c)(1),
(2) Date: Sep. 21, 2023

(87) PCT Pub. No.: WO2022/199480
PCT Pub. Date: Sep. 29, 2022

(65) Prior Publication Data
US 2024/0176906 A1  May 30, 2024

(30) Foreign Application Priority Data
Mar. 25, 2021 (CN) .......................... 202110320900.4

(51) Int. Cl.
*G06F 21/62* (2013.01)
(52) U.S. Cl.
CPC ...... *G06F 21/6245* (2013.01); *G06F 21/6209* (2013.01)

(58) Field of Classification Search
CPC .. G06F 21/6245; G06F 21/6209; G06F 21/62; G06F 17/18; G06N 20/00
See application file for complete search history.

(56) References Cited

U.S. PATENT DOCUMENTS 8,689,352 B2 * 4/2014 Schaad .................. G06Q 10/10
726/28
9,508,347 B2 * 11/2016 Wang ....................... G06N 3/02
(Continued)

FOREIGN PATENT DOCUMENTS

| CN | 110647765 A | 1/2020 |
| CN | 111062487 A | 4/2020 |

(Continued)

OTHER PUBLICATIONS

International Search Report and Written Opinion of Application No. PCT/CN2022/081672, mailed Jun. 7, 2022, 7 pages.

*Primary Examiner* — Sargon N Nano
(74) *Attorney, Agent, or Firm* — Womble Bond Dickinson (US) LLP

(57) ABSTRACT

The specification provides a method and a system for collaboratively updating a model by multiple parties for implementing privacy protection. A server can deliver an aggregation result of a t-th round of common samples to each participant i. Each participant i performs first update on a local ith model according to the t-th round of common samples and the aggregation result. Each participant i performs second update on the ith model obtained after the first update based on a first private sample fixed in a local sample set and a sample label thereof. Each participant i inputs a (t+1)th round of common samples that are used for a next round of iteration into the ith model obtained after the second update, and sends an output second prediction result to the server, so the server aggregates n second prediction (Continued)

results corresponding to n participants for a next round of iteration.

13 Claims, 4 Drawing Sheets

(56) References Cited

U.S. PATENT DOCUMENTS

| | | | | |
|---|---|---|---|---|
| 10,635,837 | B1* | 4/2020 | Jun | G06F 21/6263 |
| 11,461,593 | B2* | 10/2022 | Tuor | G06N 3/049 |
| 11,487,969 | B2* | 11/2022 | Huth | G06F 18/28 |
| 2012/0185759 | A1* | 7/2012 | Balinsky | G06F 21/6227 |
| | | | | 715/209 |
| 2019/0260784 | A1* | 8/2019 | Stockdale | H04L 63/1441 |
| 2020/0202243 | A1* | 6/2020 | Guttmann | G06N 20/00 |
| 2021/0256309 | A1* | 8/2021 | Huth | G06F 18/2148 |
| 2022/0171873 | A1* | 6/2022 | Lundbæk | G06F 16/9538 |
| 2022/0171874 | A1* | 6/2022 | Lundbæk | G06F 21/6254 |
| 2023/0076024 | A1* | 3/2023 | Baek | H04L 9/088 |
| 2024/0220656 | A1* | 7/2024 | Nozawa | G06F 21/602 |

FOREIGN PATENT DOCUMENTS

| | | |
|---|---|---|
| CN | 112329940 A | 2/2021 |
| CN | 112948885 A | 6/2021 |

\* cited by examiner

METHODS, APPARATUSES, AND SYSTEMS FOR COLLABORATIVELY UPDATING MODEL BY MULTIPLE PARTIES FOR IMPLEMENTING PRIVACY PROTECTION

CROSS-RELATED APPLICATIONS

This application is a national stage entry of international application no. PCT/CN2022/081672 filed on Mar. 18, 2022, which is herein incorporated by reference in its entirety.

TECHNICAL FIELD

One or more embodiments of this specification relate to the field of computer technologies, and in particular, to methods, apparatuses, and systems for collaboratively updating a model by multiple parties for implementing privacy protection.

BACKGROUND

The emergence of federated learning (also referred to as joint learning) revolutionizes conventional central machine learning, so participants can collaboratively construct more accurate models without having to upload local data.

Currently, federated learning is usually implemented by sharing model parameters or gradients between participants. However, because the model parameters or the gradients are usually high-dimensional privacy data, problems such as high communication overheads and privacy leakage are accompanied by conventional federated learning.

SUMMARY

One or more embodiments of this specification describe methods, apparatuses, and systems for collaboratively updating a model by multiple parties for implementing privacy protection, which can effectively reduce communication resource consumption caused by multi-party collaborative modeling, and play a privacy protection role.

According to a first aspect, a method for collaboratively updating a model by multiple parties for implementing privacy protection is provided, including: delivering, by a server, an aggregation result of a t-th round of common samples to each participant i, where the aggregation result is obtained by the server by aggregating n first prediction results that are output by the n participants based on respective local models for the t-th round of common samples; performing, by each participant i, first update on a local ith model thereof according to the t-th round of common samples and the aggregation result; performing, by each participant i, second update on the ith model obtained after the first update based on a first private sample fixed in a local sample set and a sample label thereof; inputting, by each participant i, a (t+1)th round of common samples that are used for a next round of iteration into the ith model obtained after the second update, and sending an output second prediction result to the server; aggregating, by the server, n second prediction results sent by the n participants for a next round of iteration; and after the multiple rounds of iterations, using, by each participant i, the ith model thereof obtained after the second update as a model that is updated in collaboration with another participant.

According to a second aspect, a method for collaboratively updating a model by multiple parties for implementing privacy protection is provided, including: receiving an aggregation result that is of a t-th round of common samples and delivered by the server, where the aggregation result is obtained by the server by aggregating n first prediction results that are output by the n participants based on respective local models for the t-th round of common samples; performing first update on a local ith model thereof according to the t-th round of common samples and the aggregation result; performing second update on the ith model obtained after the first update based on a first private sample fixed in a local sample set and a sample label thereof; inputting a (t+1)th round of common samples that are used for a next round of iteration into the ith model obtained after the second update, and sending an output second prediction result to the server, so the server aggregates the second prediction result and another prediction result sent by another participant, so as to be used for a next round of iteration; and after the multiple rounds of iterations, using the ith model thereof obtained after the second update as a model that is updated in collaboration with another participant.

According to a third aspect, a system for collaboratively updating a model by multiple parties for implementing privacy protection is provided, including: the server, configured to deliver an aggregation result of a t-th round of common samples to each participant i, where the aggregation result is obtained by the server by aggregating n first prediction results that are output by the n participants based on respective local models for the t-th round of common samples; each participant i is configured to perform first update on a local ith model thereof according to the t-th round of common samples and the aggregation result; each participant i is further configured to: perform second update on the ith model obtained after the first update based on a first private sample fixed in a local sample set and a sample label thereof; each participant i is further configured to: input a (t+1)th round of common samples that are used for a next round of iteration into the ith model obtained after the second update, and send an output second prediction result to the server; the server is configured to aggregate n second prediction results sent by the n participants for a next round of iteration; and each participant i is further configured to: after the multiple rounds of iterations, use the ith model thereof obtained after the second update as a model that is updated in collaboration with another participant.

According to a fourth aspect, an apparatus for collaboratively updating a model by multiple parties for implementing privacy protection is provided, including: a receiving unit, configured to receive an aggregation result that is of a t-th round of common samples and delivered by the server, where the aggregation result is obtained by the server by aggregating n first prediction results that are output by the n participants based on respective local models for the t-th round of common samples; an update unit, configured to perform first update on a local ith model thereof according to the t-th round of common samples and the aggregation result; the update unit being further configured to: perform second update on the ith model obtained after the first update based on a first private sample fixed in a local sample set and a sample label thereof; an input unit, configured to: input a (t+1)th round of common samples that are used for a next round of iteration into the ith model obtained after the second update, and send an output second prediction result to the server, so the server aggregates the second prediction result and another prediction result sent by another participant, so as to be used for a next round of iteration; and a determining unit, configured to: after the multiple rounds of iterations, use the ith model thereof obtained after the second update as a model that is updated in collaboration with another participant.

According to a fifth aspect, a computer storage medium that stores a computer program is provided, and when the computer program is executed on a computer, the computer is caused to perform the method of the first aspect or the second aspect.

According to a sixth aspect, a computing device is provided and includes a memory and a processor. Executable code is stored in the memory, and when executing the executable code, the processor implements the method of the first aspect or the second aspect.

In the method, apparatus, and system for collaboratively updating a model by multiple parties for implementing privacy protection provided in one or more embodiments of this specification, only a prediction result is transmitted between participants and a server. Because dimensions of the prediction result are usually far less than those of model parameters or gradients, communication resource consumption can be reduced in this solution. In addition, only the prediction result is transmitted between the participants and the server, so the participants can collaboratively construct models of different network structures, thereby greatly improving general adaptability of federated learning. Finally, when each participant performs second update on a local model thereof, only a private sample fixed in a local sample set thereof is used, thereby reducing privacy protection costs.

BRIEF DESCRIPTION OF DRAWINGS

To describe the technical solutions in the embodiments of this specification more clearly, the following briefly describes the accompanying drawings needed for describing the embodiments. Clearly, the accompanying drawings in the following description show merely some embodiments of this specification, and a person of ordinary skill in the art can still derive other drawings from these accompanying drawings without creative efforts.

DESCRIPTION OF EMBODIMENTS

The following describes the solutions provided in this specification with reference to the accompanying drawings.

As mentioned earlier, conventional federated learning is achieved by sharing model parameters or gradients between participants. Mainstream solutions are mainly divided into two types: The first type is federated learning based on central differential privacy (CDP); and the second type is federated learning based on local differential privacy (LDP). The following describes the two methods with reference to the accompanying drawings.

Figure 1:
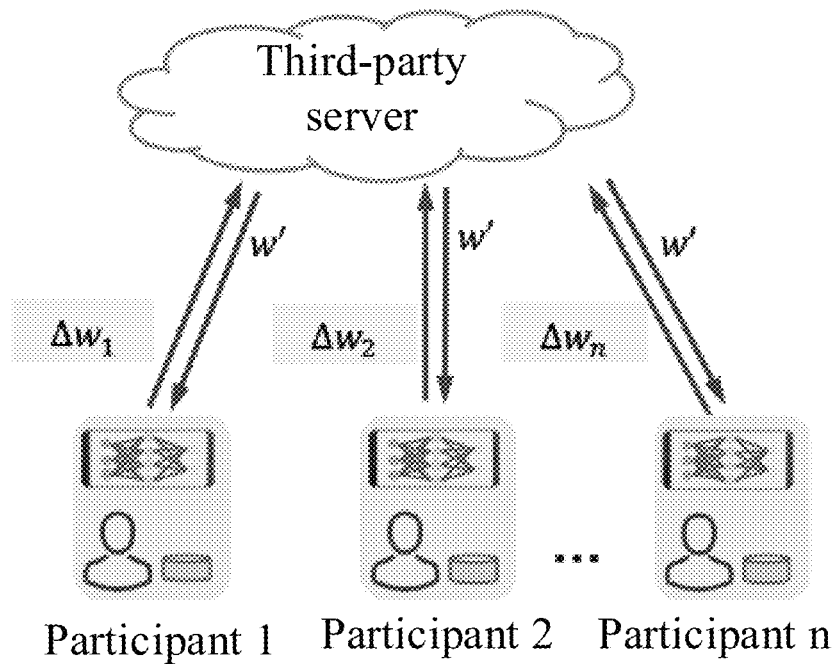
FIG. 1 is a schematic diagram illustrating federated learning based on central differential privacy.

FIG. 1 is a schematic diagram illustrating federated learning based on central differential privacy. In FIG. 1, first, participants upload their model gradients $\Delta w_1, \Delta w_2, \ldots,$ and $\Delta w_n$ to a trusted third-party server (hereinafter referred to as a server). Then, the server aggregates the model gradients uploaded by the participants:

aggregate($\Delta w_1 + \Delta w_2 + \ldots + \Delta w_n$), and adds noise M(aggregate ( . . . )) to the aggregated model gradient by using a differential privacy mechanism M. Finally, the server delivers a noise-added model gradient w' to each participant, so each participant updates a local model based on the noise-added model gradient. However, because currently trusted third parties are rare in an actual scenario and are prone to attacks by an eavesdropper, applicability of the method is relatively poor. In addition, this federated learning is only applicable to a scenario in which a quantity of participants is relatively large. When only a few participants exist, performance of a constructed model is relatively poor.

Figure 2:
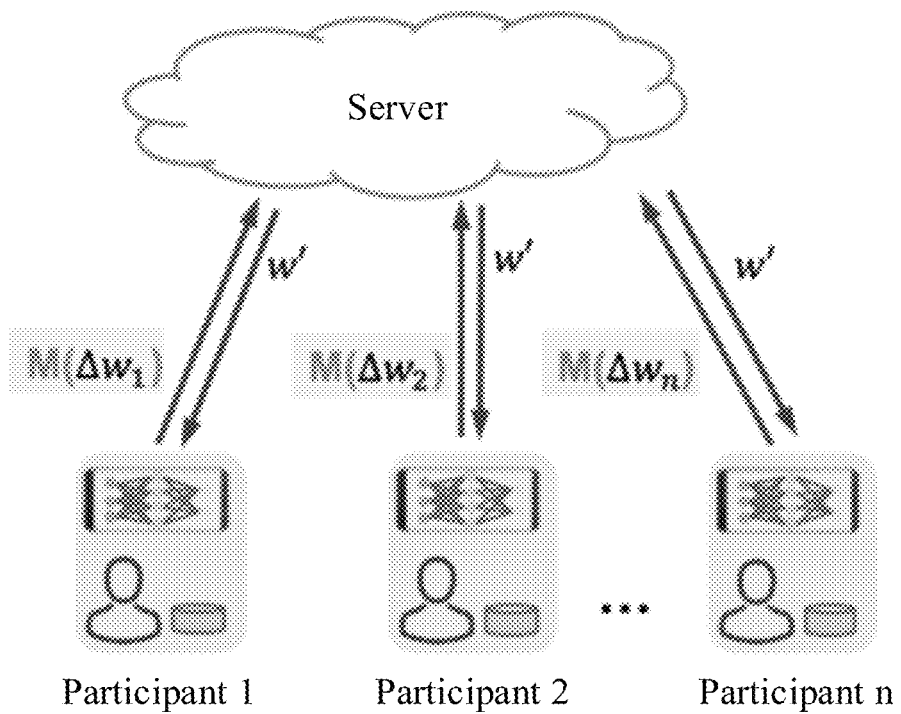
FIG. 2 is a schematic diagram illustrating federated learning based on local differential privacy.

FIG. 2 is a schematic diagram illustrating federated learning based on local differential privacy. In FIG. 2, before uploading, participants first perform local differential privacy on respective model gradients by using a differential privacy mechanism M, and then upload model gradients (M($\Delta w_1$), M($\Delta w_2$), . . . , and M($\Delta w_n$)) subjected to local differential privacy to a server. Finally, the server aggregates the model gradients of the participants subjected to local differential privacy:

aggregate($M(\Delta w_1) + M(\Delta w_2) + \ldots + M(\Delta w_n)$), and delivers an aggregated model gradient w' to each participant, so each participant updates a local model based on the aggregated model gradient. However, because local differential privacy can result in a relatively large performance loss, a model constructed using this method has relatively poor performance.

It can be understood that both the previous two types of federated learning have respective defects. In addition, because both the two types of federated learning are implemented by sharing model parameters or gradients, the two methods are only applicable to scenarios in which the same network structure model (referred to as the same structure model) is constructed in multi-party collaboration.

To overcome various shortcomings of conventional federated learning, some improvement methods propose to implement federated learning by sharing model prediction results (hereinafter referred to as prediction results) between participants. For details, refer to FIG. 3.

Figure 3:
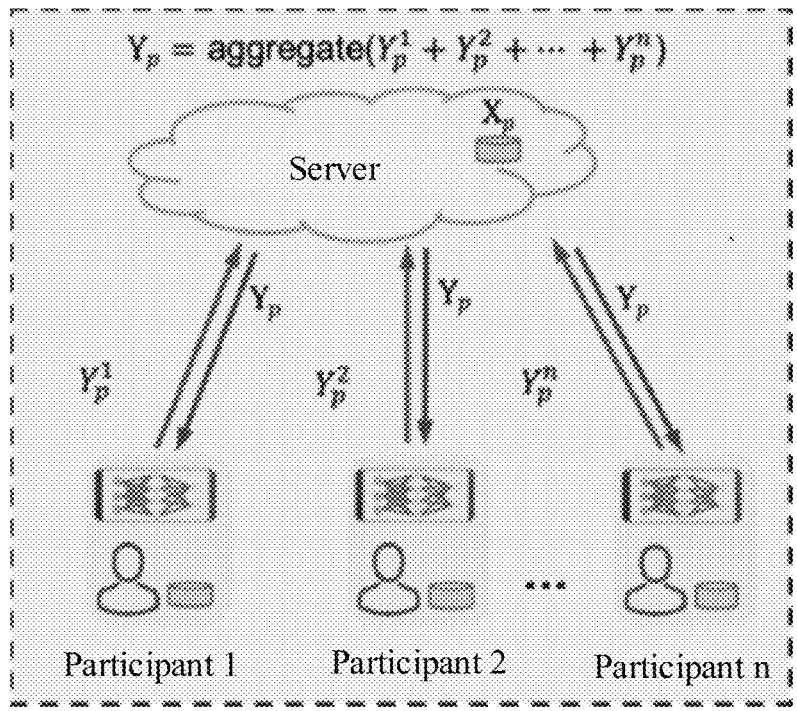
FIG. 3 is a schematic diagram illustrating federated learning based on a shared prediction result.

In FIG. 3, the participants first pre-train respective local models based on respective local sample sets, then perform prediction for common samples $x^p$ by using the pre-trained models, and upload respective prediction results for the common samples $x^p$ to a server, which are respectively represented as $Y_p^1, Y_p^2, \ldots, Y_p^n$. The server aggregates the prediction results uploaded by the participants:

$Y_p$=aggregate($Y_p^1 + Y_p^2 + \ldots + Y_p^n$), and delivers an aggregation result $Y_p$ to the participants, so the participants update respective pre-trained models based on the aggregation result. It is worthwhile to note that, although this method can be used to solve a problem that conventional federated learning can only collaboratively construct the same structure model, communication resource consumption can be reduced (a dimension of a prediction result is far less than a model parameter or gradient). However, because a prediction result of each participant is also a result output by a model, sensitive information of a local sample set is also leaked to some extent. For example, an attacker can perform a membership inference attack based on the prediction result.

The following describes that a prediction result also leaks sensitive information of a local sample set. Assume that there are two participants. After obtaining an aggregation result $Y_p$, one of the participants (hereinafter referred to as an attacker) can calculate a prediction result of the other participant according to the aggregation result and a prediction result of the participant. Then, based on the calculated prediction result and a common sample, the attacker can further speculate parameter information of a pre-trained model of the other participant. A pre-trained model of each participant is obtained based on training of a local sample set of the participant, that is, the pre-trained model of each participant incorporates privatization information of the participant. Therefore, when the attacker speculates parameter information of the pre-trained model, sensitive information of the local sample set of the participant is also leaked to some extent.

To resolve the previous problem of sensitive information leakage, one method is to add random noise that satisfies differential privacy to a prediction result of each participant. Although this can alleviate privacy problems, it brings another new problem: The guarantee of model performance usually requires a very large privacy budget to trade off.

Based on this, this application proposes a method for collaboratively constructing a model by multiple parties for implementing privacy protection. Each participant performs two times of local model update, one of which is based on a common sample and an aggregation result of prediction results of the participants, thereby implementing consensus of each participant on the common sample. The other time of update is performed based on a sampling private sample (that is, a first private sample) fixed in a local sample set and a sample label thereof, thereby implementing personalized training on a respective local model of each participant.

In conclusion, the solutions provided in the embodiments of this specification can solve a privacy protection problem of each participant in a process of collaboratively constructing different structural models, and can balance communication efficiency and model performance.

Figure 4:
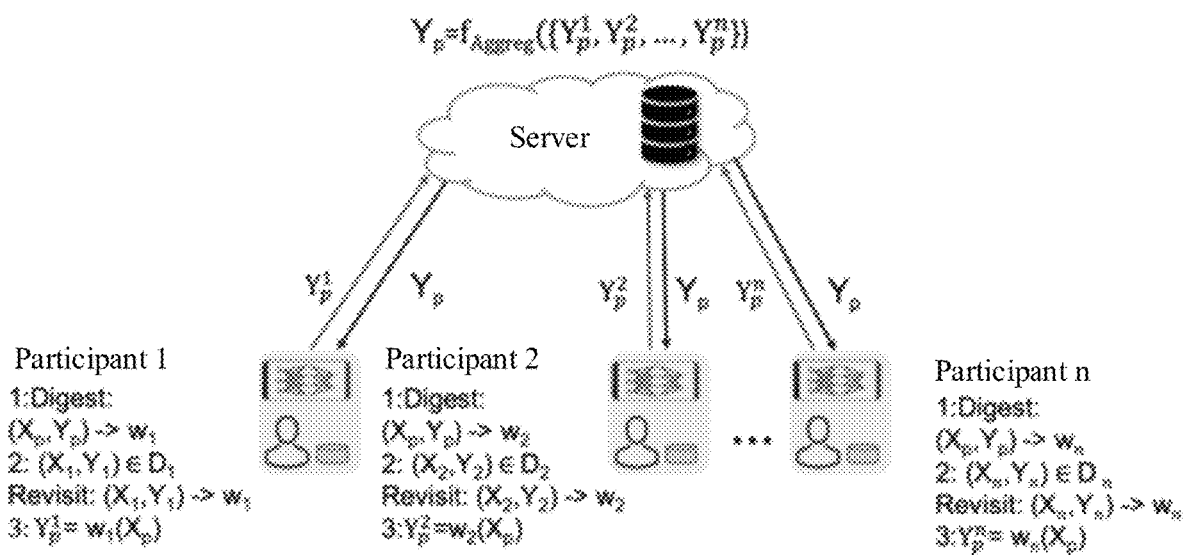
FIG. 4 is a schematic diagram illustrating an implementation scenario of an embodiment according to this specification.

FIG. 4 is a schematic diagram illustrating an implementation scenario of an embodiment according to this specification. In FIG. 4, a scenario of collaboratively updating a model by multiple parties involves a server and n participants, where n is a positive integer. Each participant can be implemented as any device, platform, server, or device cluster with computing and processing capabilities. In a specific example, each participant can be a mechanism with a sample set of a different size. It is worthwhile to note that, the server and each participant need to collaboratively update a respective local model of the participant while protecting data privacy. The model here can be a service prediction model used to execute a prediction task for a service object. The service object can be, for example, a picture, an audio, or a text.

In FIG. 4, any participant i locally maintains an ith model $w_i$ and has an ith local sample set $D_i$, and a private sample $X_i$ in the local sample set $D_i$ has a sample label $Y_i$. The server can maintain a common sample set $D_p$, or can maintain only description information (including information such as an index of a sample) of each common sample $X_p$ in the common sample set $D_p$, and an actual common sample set $D_p$ is provided by a third party.

Specifically, in a t-th round of iteration, the server can deliver an aggregation result $Y_p[t]$ of a t-th round of common samples $X_p[t]$ to each participant i. The aggregation result $Y_p[t]$ is obtained by the server by aggregating n first prediction results that are output by n participants for the t-th round of common samples $X_p[t]$ based on respective local models. The n first prediction results here can be respectively represented as $Y_p^1[t], Y_p^2[t], \ldots, Y_p^n[t]$. Each participant i performs first update on a local ith model according to the t-th round of common samples $X_p[t]$ and the aggregation result $Y_p[t]$. Then, each participant i performs second update on the ith model obtained after the first update based on a first private sample $X_1$ fixed in a local sample set and a sample label $Y_1$ thereof. Finally, each participant i inputs a (t+1)th round of common samples $X_p[t+1]$ that are used for a next round of iteration into the ith model obtained after the second update, and sends an output second prediction result to the server, so the server aggregates n second prediction results (that is, $Y_p^1[t+1], Y_p^2[t+1], \ldots, Y_p^n[t+1]$) corresponding to the n participants, and after a next round of iteration starts, delivers an aggregation result $Y_p[t+1]$ to each participant. It should be understood that, after multiple rounds of iterations end, each participant i can use the ith model thereof obtained after the second update as a model that is updated in collaboration with another participant.

The following uses the implementation scenario shown in FIG. 4 as an example to describe a method for collaboratively updating a model by multiple parties for implementing privacy protection provided in this specification.

Figure 5:
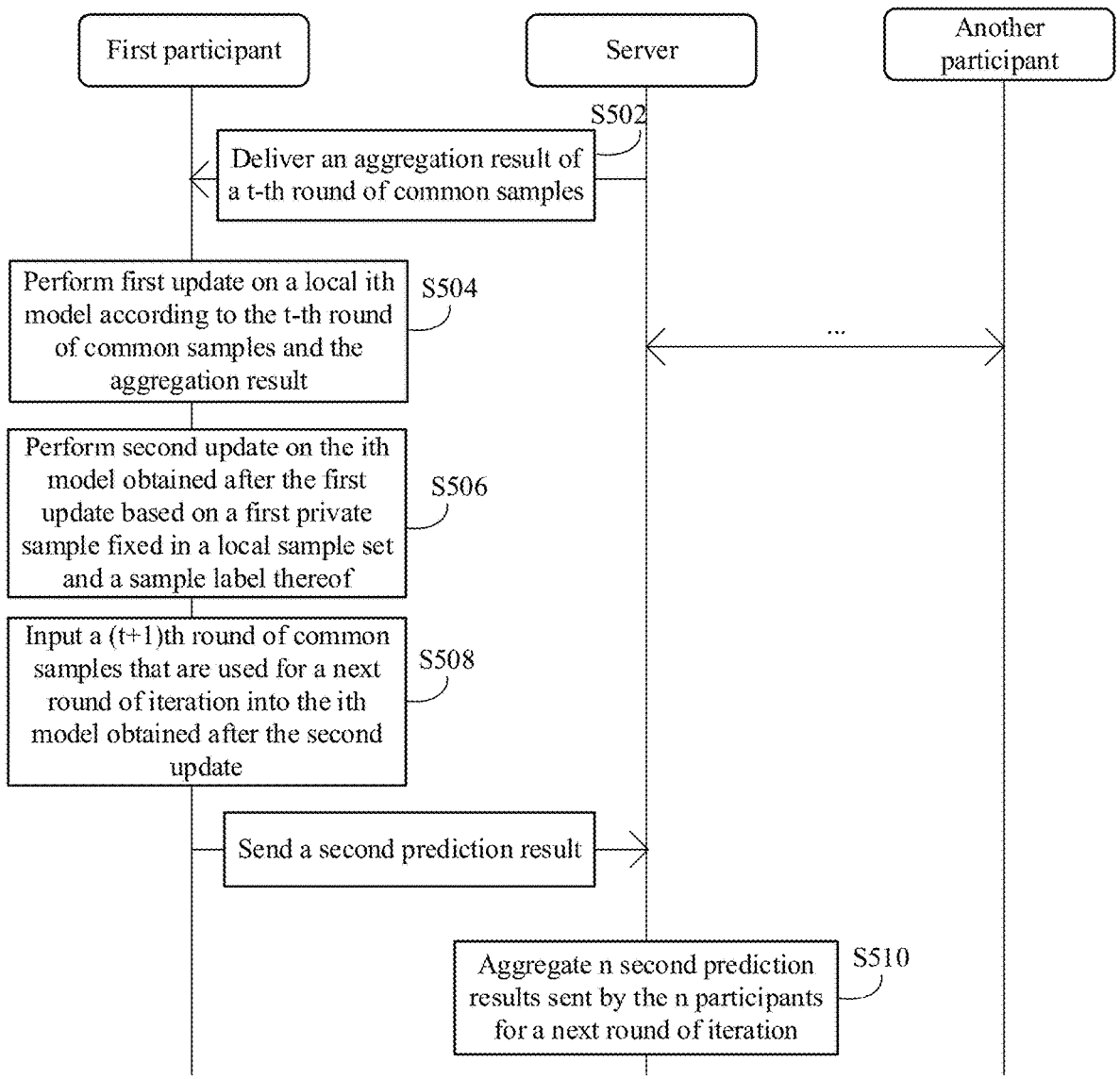
FIG. 5 is an interaction diagram illustrating a method for collaboratively updating a model by multiple parties for implementing privacy protection according to an embodiment of this specification.

FIG. 5 is an interaction diagram illustrating a method for collaboratively updating a model by multiple parties for implementing privacy protection according to an embodiment of this specification. It is worthwhile to note that the method involves multiple rounds of iterations. FIG. 5 shows interaction steps included in a t-th round of iteration (t is a positive integer). In addition, because a process of interaction between each participant participating in the t-th round of iteration and a server is similar, FIG. 5 mainly shows interaction steps between any participant participating in the t-th round of iteration (referred to as a first participant for ease of description) and the server. For interaction steps between another participant participating in this round of iteration and the server, refer to the interaction steps between the first participant and the server. It can be understood that, by repeatedly performing the shown interaction steps, multiple rounds of iterative update of models maintained by each participant can be implemented, and a model obtained after the last round of iterative update is used as a model finally used by each participant. As shown in FIG. 5, the method can include the following steps: Step 502: The server delivers an aggregation result of a t-th round of common samples to each participant i.

The aggregation result can be obtained by the server by aggregating n first prediction results that are output by n participants for the t-th round of common samples based on respective local models. i is a positive integer not exceeding n.

The t-th round of common samples here can be one of the following: a picture, a text, an audio, etc. That the t-th round of common samples is a picture is used as an example. Any first prediction result in the previous n first prediction results can be a recognition result of the picture, for example, a score of the picture corresponding to each predetermined category.

It is worthwhile to note that when the t-th round of iteration is the first round of iteration, the t-th round of common samples can be pre-selected by the server before multiple rounds of iteration start. When the t-th round of iteration is not the first round of iteration, the t-th round of common samples can be pre-selected by the server in a (t−1)th round of iteration. The following describes a method for selecting the t-th round of common samples by the server in two cases.

In a first case, a common sample set is maintained in the server. In this case, before the multiple rounds of iteration start or at the (t−1)th round of iteration, the server can randomly select several common samples from the common sample set maintained in the server as the t-th round of common samples, and send the common samples to each participant i. Or the server can randomly select, from the common sample set maintained in the server, several common samples as the t-th round of common samples, and send an indication of the t-th round of common samples to each participant i. Then, each participant i obtains the t-th round of common samples from the server according to the received indication.

In a second case, a common sample set is maintained in a third party, and description information of each common sample in the common sample set is maintained in the server. The description information here includes but is not limited to information such as an index of each common sample. In this case, the server can randomly select, from the description information of each common sample maintained in the server, description information of several common samples as description information of the t-th round of common samples, and send the description information to each participant i. Then, each participant i obtains the t-th round of common samples from the third party according to the received description information.

It is worthwhile to note that after the server selects the t-th round of common samples, and each participant i obtains the t-th round of common samples, the participant can output a corresponding first prediction result for the t-th round of common samples based on a local ith model.

In this specification, network structures of local models of participants can be the same or different. Being different here can be divided into the following two cases: In a first case, model types are different. For example, when there are two participants, a model maintained by one of the two participants can be an artificial neural network (ANN), and a model maintained by the other participant can be extreme gradient boosting (XGBoost). In a second case, model types are the same, but specific expression forms are inconsistent. For example, models maintained by participants are convolutional neural networks (CNN), but quantities of network layers of the models are inconsistent.

Specifically, when the t-th round of iteration is the first round of iteration, the local ith model of each participant i is obtained by performing the following pre-training steps: Each participant i can obtain an initial model of a corresponding network structure (for a case of different network structures); or can receive an initial model delivered uniformly by the server (for a case of the same network structure). Then, the corresponding initial model is updated based on a sample subset randomly selected from a local sample set (hereinafter referred to as a first private sample) and a sample label thereof, to obtain the local ith model.

When the t-th round of iteration is not the first round of iteration, the local ith model of each participant i can refer to the ith model obtained after second update in the (t−1)th round of iteration. Two update processes of the ith model obtained after second update are described subsequently.

It is worthwhile to note that in this embodiment of this specification, each participant i updates the corresponding initial model based on the first private sample randomly selected from the local sample set and the sample label thereof, so as to avoid a problem of sensitive information leakage of each participant. A reason is that each participant i uses the first private sample randomly selected from the local sample set thereof i to update the corresponding initial model, which is equivalent to adding random noise to a personalized trained model, so the obtained ith model has a differential privacy function. According to a post-processing characteristic of differential privacy, data subsequently output based on the ith model satisfies a requirement of differential privacy. Therefore, differential privacy protection of privacy data of each participant can be ensured.

Step 504: Each participant i performs first update on a local ith model according to the t-th round of common samples and the aggregation result.

Specifically, each participant i can input the t-th round of common samples into the local ith model thereof to obtain a first local prediction result. Then, the aggregation result is used as the sample label of the t-th round of common samples, and a first prediction loss is determined based on the sample label and the first local prediction result. For example, the first prediction loss can be determined based on a difference between the sample label and the local prediction result. Finally, according to the first predicted loss, first update is performed on the local ith model thereof.

For example, based on the first prediction loss, an update gradient corresponding to a model parameter of the ith model can be first calculated by using a back propagation method, and then first update is performed on the ith model based on the update gradient. More specifically, a product between an update gradient corresponding to the model parameter of the ith model and a learning step (that is, a hyper parameter) is subtracted from the model parameter of the ith model, to obtain an updated model parameter of the ith model, and the updated model parameter is determined as the ith model obtained after first update.

It should be understood that, in this step, first update performed on the local model of each participant based on the common sample can implement consensus of each participant on the common sample.

Step 506: Each participant i performs second update on the ith model obtained after the first update based on a first private sample fixed in a local sample set and a sample label thereof.

The private sample in the local sample set of each participant i can be one of the following: a picture, a text, an audio, etc. It should be understood that, when both the ith round of common samples and the first private sample are pictures, the ith model obtained after second update here can be a picture recognition model. When the ith round of common samples and the first private sample are texts, the ith model obtained after second update here can be a text recognition model. In addition, when the ith round of common samples and the first private sample are audios, the ith model obtained after second update here can be an audio recognition model.

Second update in step 506 can specifically include: Each participant i can input the first private sample fixed in the local sample set into the ith model obtained after first update to obtain a second local prediction result. Then, a second prediction loss is determined based on the sample label of the first private sample and the second local prediction result. For example, the second prediction loss can be determined based on a difference between the sample label of the first private sample and the second local prediction result. Finally, second update is performed on the ith model obtained after first update according to the second prediction loss. For the second update step based on the second prediction loss, refer to the previous first update. Details are omitted here for simplicity in this application.

It is worthwhile to note that the first private sample used in step 506 is a first private sample randomly selected locally and used by each participant i when updating the corresponding initial model. That is, after multiple rounds of iteration start, any participant i performs second update in each round of iteration based on the fixed first private sample.

It is noted here that in this embodiment of this specification, any participant i performs second update based on the fixed first private sample in each round of iteration, thereby reducing privacy protection costs. The reason is as follows: Assume that if a randomly selected private sample is used in this step, it is equivalent to adding new random noise to each round of iteration after multiple rounds of iteration start. This causes that the added random noise increases with rounds of iteration. However, according to a characteristic of differential privacy, the added random noise usually needs to be balanced by using a privacy budget. Specifically, when larger random noise is added, a larger privacy budget is required to ensure data availability, which greatly consumes privacy protection costs. Therefore, in this embodiment of this specification, any participant i uses the fixed first private sample in each round of iteration, so it can be ensured that no new random noise is added after multiple rounds of iteration start, so the privacy budget can be fixed. It should be understood that, because differential privacy has a post-processing characteristic, even if no new random noise is added to each subsequent round of iteration, the differential privacy requirement is also met by using data output by each participant i from the ith model with the differential privacy function.

In conclusion, the solution provided in this embodiment of this specification can ensure differential privacy protection for data of each participant in a relatively small privacy budget, and differential privacy protection does not affect model performance of each participant.

In addition, in this step, each participant performs second update on a respective local model based on a respective fixed first private sample, thereby implementing personalized training on the respective local model of each participant.

Step 508: Each participant i inputs a (t+1)th round of common samples that are used for a next round of iteration into the ith model obtained after the second update, and sends an output second prediction result to the server.

The (t+1)th round of common samples here can be selected by the server in t rounds of iteration before performing step 508. A specific selection method is similar to the previous method for selecting the t-th round of common samples, and details are omitted here for simplicity. In addition, the second prediction result here is similar to the previous first prediction result. For example, the second prediction result can be an image recognition result, a text recognition result, an audio recognition result, etc.

It is worthwhile to note that, as described above, the local ith model of each participant i has a differential privacy function, so when the second prediction result is output based on the step, the output second prediction result satisfies a requirement of differential privacy. That is, when each participant i sends a corresponding second prediction result to the server, sensitive information of each participant is not leaked.

Step 510: The server aggregates n second prediction results sent by the n participants for a next round of iteration.

For example, the server can perform summing, weighted summing, or weighted averaging on the n second prediction results, to obtain the aggregation result of the (t+1)th round of common samples. Then, after entering the (t+1)th round of iteration, the server can deliver the aggregation result to each participant, and then each participant performs first and second update on the respective local model again.

In other words, in this embodiment of this specification, the previous step 502 to step 510 are repeatedly performed for multiple times, thereby implementing multiple rounds of iterative update on the respective local model of each participant. In addition, a model parameter used for each round of iteration is a parameter updated in a previous round. A termination condition of the iteration can be that a quantity of iteration times reaches a predetermined quantity of rounds or the model parameter converges.

After multiple rounds of iterations, each participant i uses the ith model thereof obtained after the second update as a model that is updated in collaboration with another participant.

By using any participant i as an example, when the previous common sample and the sample in the local sample set thereof are pictures, the model that is collaboratively updated by the participant and another participant can be a picture recognition model. When the previous common sample and the sample in the local sample set thereof are audios, the model that is collaboratively updated by the participant and another participant can be an audio recognition model. When the previous common sample and the sample in the local sample set thereof are texts, the model that is collaboratively updated by the participant and another participant can be a text recognition model etc.

It should be understood that, when local model network structures of the participants are different, a participant with a large-scale local sample set can obtain a complex model, and a participant with a small quantity of local sample sets can obtain a relatively simple model through update, so this solution can implement barrier-free cooperation between participants with different scales of sample sets.

In conclusion, in this embodiment of this specification, only a prediction result is transmitted between participants and a server. Because dimensions of the prediction result are usually far less than those of model parameters or gradients, communication resource consumption can be reduced in this solution. In addition, only the prediction result is transmitted between the participants and the server, so the participants can collaboratively construct models of different network structures, thereby greatly improving general adaptability of federated learning. In addition, the participants update respective initial models based on randomly selected private samples in the local sample sets to obtain respective local models, which can ensure differential privacy protection of data of the participants. Finally, when each participant performs second update on a local model thereof, only a private sample fixed in a local sample set thereof is used, thereby reducing privacy protection costs.

Figure 6:
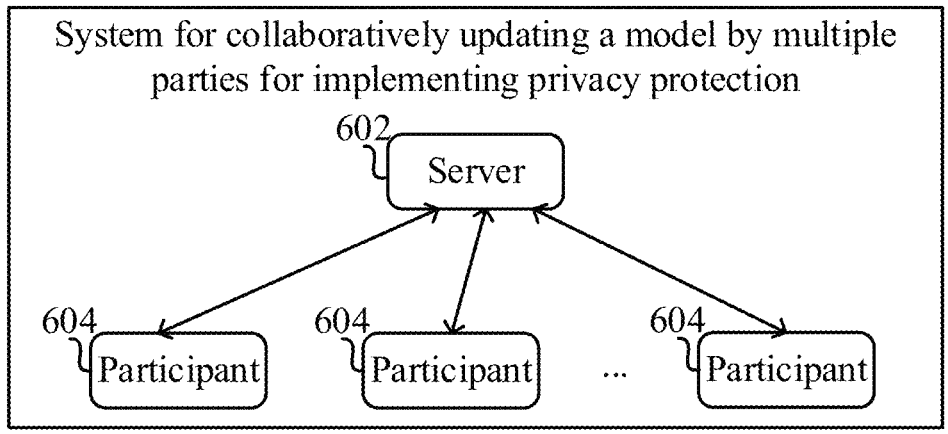
FIG. 6 is a schematic diagram illustrating a system for collaboratively updating a model by multiple parties for implementing privacy protection according to an embodiment of this specification.

Corresponding to the previous method for collaboratively updating a model by multiple parties for implementing privacy protection, an embodiment of this specification further provides a system for collaboratively updating a model by multiple parties for implementing privacy protection. As shown in FIG. 6, the system can include a server 602 and n participants 604.

The server 602 is configured to deliver an aggregation result of a t-th round of common samples to each participant i. The aggregation result is obtained by the server by aggregating n first prediction results that are output by n participants for the t-th round of common samples based on respective local models.

Each participant 604 is configured to perform first update on a local ith model thereof according to the t-th round of common samples and the aggregation result.

Network structures of the respective local models of the n participants are different.

Each participant 604 is further configured to: perform second update on the ith model obtained after the first update based on a first private sample fixed in a local sample set and a sample label thereof.

Each participant 604 is further configured to: input a (t+1)th round of common samples that are used for a next round of iteration into the ith model obtained after the second update, and send an output second prediction result to the server 602.

The server 602 is configured to aggregate n second prediction results sent by the n participants for a next round of iteration.

The server 602 is specifically configured to perform summing, weighted summing, or weighted averaging on the n second prediction results.

Each participant 604 is further configured to: after the multiple rounds of iterations, use the ith model thereof obtained after the second update as a model that is updated in collaboration with another participant.

A sample in a local sample set of any participant i is a picture, and a model that is updated by the any participant i in collaboration with another participant is a picture recognition model; or a sample in a local sample set of any participant i is an audio, and a model that is updated by the any participant i in collaboration with another participant is an audio recognition model; or a sample in a local sample set of any participant i is a text, and a model that is updated by the any participant i in collaboration with another participant is a text recognition model.

Optionally, a common sample set is maintained in the server 602; and the server 602 is further configured to randomly select several common samples from the common sample set maintained in the server as the (t+1)th round of common samples, and send an indication of the (t+1)th round of common samples to each participant 604; or the server 602 is further configured to randomly select several common samples from the common sample set maintained in the server as the (t+1)th round of common samples, and send an indication of the (t+1)th round of common samples to each participant 604; and each participant 604 is further configured to obtain the (t+1)th round of common samples from the server 602 according to the indication.

Optionally, a common sample set is maintained in a third party, and description information of each common sample in the common sample set is maintained in the server 602; the server 602 is further configured to randomly select description information of several common samples as description information of the (t+1)th round of common samples, and deliver the description information to each participant 604; and each participant 604 is further config-ured to obtain the (t+1)th round of common samples from the third party according to the received description information.

Functions of function modules of the previous system embodiment of this specification can be implemented by performing the steps in the previous method embodiment. A specific working process of the system provided in some embodiments of this specification is omitted here.

An embodiment of this specification provides a system for collaboratively updating a model by multiple parties for implementing privacy protection, so as to solve a privacy protection problem of each participant in a process of collaboratively constructing different structural models, and can balance communication efficiency and model performance.

Figure 7:
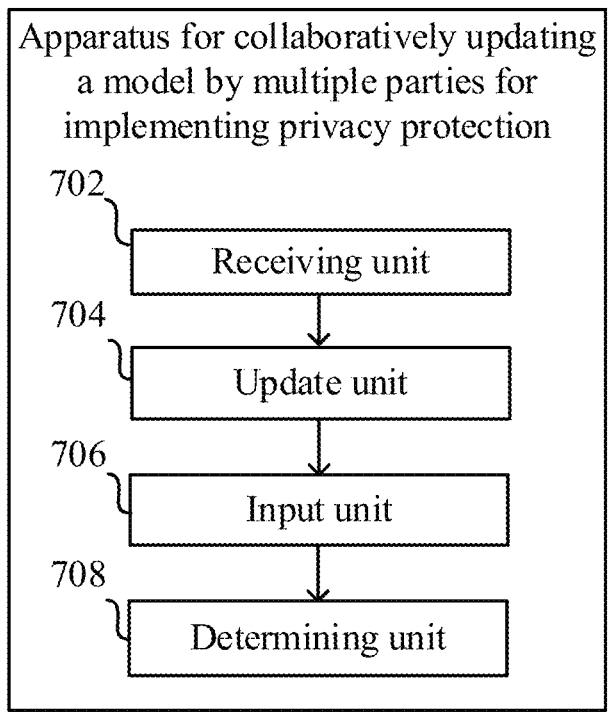
FIG. 7 is a schematic diagram illustrating an apparatus for collaboratively updating a model by multiple parties for implementing privacy protection according to an embodiment of this specification.

Corresponding to the previous method for collaboratively updating a model by multiple parties for implementing privacy protection, an embodiment of this specification further provides an apparatus for collaboratively updating a model by multiple parties for implementing privacy protection. The multiple parties here include a server and n participants. The apparatus is disposed in any participant i of the n participants, and is configured to perform multiple rounds of iteration. As shown in FIG. 7, the apparatus performs any t-th round of iteration by using the following units included in the apparatus: a receiving unit 702, configured to receive an aggregation result that is of a t-th round of common samples and delivered by a server; where the aggregation result is obtained by the server by aggregating n first prediction results that are output by n participants for the t-th round of common samples based on respective local models;

an update unit 704, configured to perform first update on a local ith model thereof according to the t-th round of common samples and the aggregation result;

the update unit 704 being specifically configured to: input the t-th round of common samples into the local ith model thereof to obtain a local prediction result; use the aggregation result as a sample label of the t-th round of common samples, and determine a prediction loss based on the sample label and the local prediction result; and perform first update on the local ith model thereof according to the prediction loss;

the update unit 704 being further configured to: perform second update on the ith model obtained after the first update based on a first private sample fixed in a local sample set and a sample label thereof;

an input unit 706, configured to: input a (t+1)th round of common samples that are used for a next round of iteration into the ith model obtained after the second update, and send an output second prediction result to the server, so the server aggregates the second prediction result and another prediction result sent by another participant, so as to be used for a next round of iteration; and a determining unit 708, configured to: after the multiple rounds of iterations, use the ith model thereof obtained after the second update as a model that is updated in collaboration with another participant.

Optionally, the receiving unit 702 is further configured to receive an initial model delivered by the server; and the update unit 704 is further configured to update the initial model based on the first private sample fixed in the local sample set and the sample label thereof, to obtain the ith model.

Functions of function modules of the previous apparatus embodiment of this specification can be implemented by performing the steps in the previous method embodiment. A specific working process of the apparatus provided in some embodiments of this specification is omitted here.

An embodiment of this specification provides an apparatus for collaboratively updating a model by multiple parties for implementing privacy protection, so as to solve a privacy protection problem of each participant in a process of collaboratively constructing different structural models, and can balance communication efficiency and model performance.

According to an embodiment of another aspect, a computer readable storage medium is further provided, on which a computer program is stored. When the computer program is executed in a computer, the computer is caused to perform the method described with reference to FIG. 5.

According to an embodiment of still another aspect, a computing device is further provided and includes a memory and a processor. Executable code is stored in the memory, and when executing the executable code, the processor implements the method with reference to FIG. 5.

The embodiments in this specification are described in a progressive way. For the same or similar parts of the embodiments, references can be made to the embodiments. Each embodiment focuses on a difference from other embodiments. Particularly, a device embodiment is similar to a method embodiment, and therefore is described briefly. For related parts, references can be made to related descriptions in the method embodiment.

The methods or algorithm steps described with reference to the content disclosed in this specification can be implemented in a hardware method, or can be implemented in a method in which a processor executes a software instruction. The software instruction can include a corresponding software module. The software module can be stored in a RAM memory, a flash memory, a ROM memory, an EPROM memory, an EEPROM memory, a register, a hard disk, a removable hard disk, a CD-ROM, or any other form of storage medium well-known in the art. An example storage medium is coupled to the processor, so the processor can read information from the storage medium and can write information to the storage medium. Certainly, the storage medium can also be an integral part of the processor. The processor and the storage medium can be located in the ASIC. In addition, the ASIC can be located in a server. Certainly, the processor and the storage medium can also exist in the server as separate parts.

A person skilled in the art should be aware that in the previous one or more examples, functions described in the present disclosure can be implemented by hardware, software, firmware, or any combination thereof. When this application is implemented by software, the functions can be stored in a computer-readable medium or transmitted as one or more instructions or code in the computer-readable medium. The computer readable medium includes a computer storage medium and a communication medium, where the communication medium includes any medium that facilitates the transfer of a computer program from one place to another. The storage medium can be any available medium accessible to a general-purpose or dedicated computer.

Specific embodiments of this specification are described above. Other embodiments fall within the scope of the appended claims. In some situations, the actions or steps described in the claims can be performed in an order different from the order in the embodiments and the desired results can still be achieved. In addition, the process depicted in the accompanying drawings does not necessarily need a particular execution order to achieve the desired results. In some implementations, multi-tasking and concurrent processing is feasible or can be advantageous.

The objectives, technical solutions, and benefits of this specification are further described in detail in the earlier-described specific implementations. It should be understood that the earlier-described descriptions are merely specific implementations of this specification, but are not intended to limit the protection scope of this specification. Any modification, equivalent replacement, or improvement made based on the technical solutions of this specification shall fall within the protection scope of this specification.

What is claimed is:

1. A method for collaboratively updating a model by multiple parties for implementing privacy protection, wherein the multiple parties comprise a server and n participants;

and the method comprises multiple rounds of iterations, and any t-th round of iteration therein comprises:

delivering, by the server, an aggregation result of a t-th round of common samples to each participant i, wherein the aggregation result is obtained by the server by aggregating n first prediction results that are output by the n participants based on respective local models for the t-th round of common samples;

performing, by each participant i, first update on a local ith model thereof according to the t-th round of common samples and the aggregation result;

performing, by each participant i, second update on the ith model obtained after the first update based on a first private sample fixed in a local sample set and a sample label thereof;

inputting, by each participant i, a (t+1)th round of common samples that are used for a next round of iteration into the ith model obtained after the second update, and sending an output second prediction result to the server;

aggregating, by the server, n second prediction results sent by the n participants for a next round of iteration; and after the multiple rounds of iterations, using, by each participant i, the ith model thereof obtained after the second update as a model that is updated in collaboration with another participant.

2. The method according to claim 1, wherein a common sample set is maintained in the server; and before the inputting, by each participant i, a (t+1)th round of common samples that are used for a next round of iteration into the ith model obtained after the second update, the method further comprises:

randomly selecting, by the server, several common samples from the common sample set maintained in the server as the (t+1)th round of common samples, and sending the (t+1)th round of common samples to each participant i; or randomly selecting, by the server, several common samples from the common sample set maintained in the server as the (t+1)th round of common samples, and sending an indication of the (t+1)th round of common samples to each participant i; and obtaining, by each participant i, the (t+1)th round of common samples from the server according to the indication.

3. The method according to claim 1, wherein a common sample set is maintained in a third party, and description information of each common sample in the common sample set is maintained in the server; and before the inputting, by each participant i, a (t+1)th round of common samples that are used for a next round of iteration into the ith model obtained after the second update, the method further comprises:

randomly selecting, by the server, description information of several common samples as description information of the (t+1)th round of common samples, and delivering the description information to each participant i; and obtaining, by each participant i, the (t+1)th round of common samples from the third party according to the description information.

4. The method according to claim 1, wherein
a sample in a local sample set of any participant i is a picture, and a model that is updated by the any participant i in collaboration with another participant is a picture recognition model; or
a sample in a local sample set of any participant i is an audio, and a model that is updated by the any participant i in collaboration with another participant is an audio recognition model; or
a sample in a local sample set of any participant i is a text, and a model that is updated by the any participant i in collaboration with another participant is a text recognition model.

5. The method according to claim 1, wherein network structures of the respective local models of the n participants are different.

6. The method according to claim 1, wherein the aggregating, by the server, n second prediction results sent by the n participants comprises:

performing, by the server, summing, weighted summing, or weighted averaging on the n second prediction results.

7. A system for collaboratively updating a model by multiple parties for implementing privacy protection, comprising a server and n participants;

wherein the server comprises a processor and a non-transitory computer-readable storage medium coupled to the processor and comprising executable instructions stored thereon which, when executed, cause the server to deliver an aggregation result of a t-th round of common samples to each participant i, wherein the aggregation result is obtained by the server by aggregating n first prediction results that are output by the n participants based on respective local models for the t-th round of common samples;

each participant i is configured to perform first update on a local ith model thereof according to the t-th round of common samples and the aggregation result;

each participant i is further configured to: perform second update on the ith model obtained after the first update based on a first private sample fixed in a local sample set and a sample label thereof;

each participant i is further configured to: input a (t+1)th round of common samples that are used for a next round of iteration into the ith model obtained after the second update, and send an output second prediction result to the server;

the executable instructions, when executed, further cause the server to aggregate n second prediction results sent by the n participants for a next round of iteration; and each participant i is further configured to: after the multiple rounds of iterations, use the ith model thereof obtained after the second update as a model that is updated in collaboration with another participant.

8. The system according to claim 7, wherein a common sample set is maintained in the server; and the executable instructions, when executed, further cause the server is further configured to randomly select several common samples from the common sample set maintained in the server as the (t+1)th round of common samples, and send the (t+1)th round of common samples to each participant i; or the executable instructions, when executed, further cause the server to randomly select several common samples from the common sample set maintained in the server as the (t+1)th round of common samples, and send an indication of the (t+1)th round of common samples to each participant i; and each participant i is further configured to obtain the (t+1)th round of common samples from the server according to the indication.

9. The system according to claim 7, wherein a common sample set is maintained in a third party, and description information of each common sample in the common sample set is maintained in the server; and the executable instructions, when executed, further cause the server to randomly select description information of several common samples as description information of the (t+1)th round of common samples, and deliver the description information to each participant i; and each participant i is further configured to obtain the (t+1)th round of common samples from the third party according to the description information.

10. The system according to claim 7, wherein
a sample in a local sample set of any participant i is a picture, and a model that is updated by the any participant i in collaboration with another participant is a picture recognition model; or
a sample in a local sample set of any participant i is an audio, and a model that is updated by the any participant i in collaboration with another participant is an audio recognition model; or
a sample in a local sample set of any participant i is a text, and a model that is updated by the any participant i in collaboration with another participant is a text recognition model.

11. The system according to claim 7, wherein network structures of the respective local models of the n participants are different.

12. The system according to claim 7, wherein the executable instructions, when executed, further cause the server to perform summing, weighted summing, or weighted averaging on the n second prediction results.

13. A non-transitory computer readable storage medium having stored therein instructions that, when executed by a processor of a computing device, cause the processor to:

deliver, by the server, an aggregation result of a t-th round of common samples to each participant i, wherein the aggregation result is obtained by the server by aggregating n first prediction results that are output by the n participants based on respective local models for the t-th round of common samples;

perform, by each participant i, first update on a local ith model thereof according to the t-th round of common samples and the aggregation result;

perform, by each participant i, second update on the ith model obtained after the first update based on a first private sample fixed in a local sample set and a sample label thereof;

input, by each participant i, a (t+1)th round of common samples that are used for a next round of iteration into the ith model obtained after the second update, and send an output second prediction result to the server;

aggregate, by the server, n second prediction results sent by the n participants for a next round of iteration; and after the multiple rounds of iterations, use, by each participant i, the ith model thereof obtained after the second update as a model that is updated in collaboration with another participant.

\* \* \* \* \*